Figure 1:
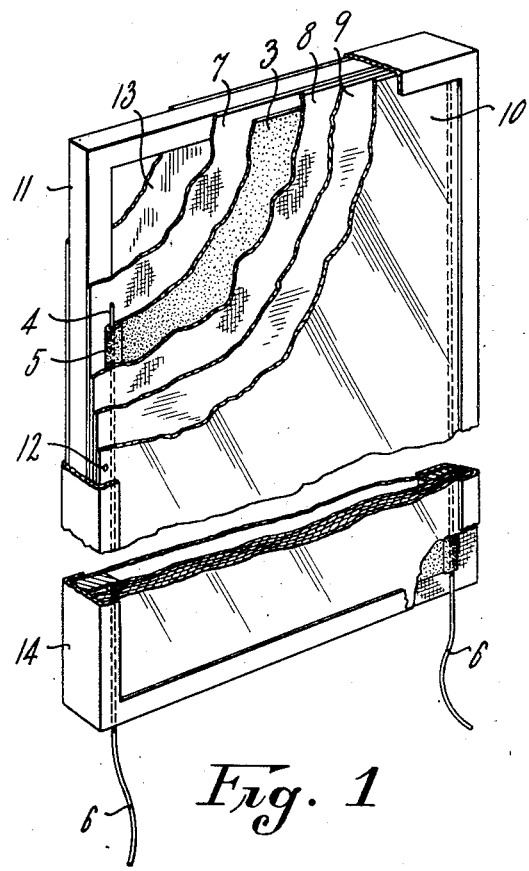

Jan. 4, 1949.　　　　L. MARICK　　　　2,458,184

ELECTRICALLY CONDUCTING PANEL

Filed Jan. 15, 1944

INVENTOR.
LOUIS MARICK
BY
ATTORNEY

Patented Jan. 4, 1949

2,458,184

UNITED STATES PATENT OFFICE 2,458,184

ELECTRICALLY CONDUCTING PANEL

Louis Marick, Grosse Pointe Farms, Mich., assignor to United States Rubber Company, New York, N. Y., a corporation of New Jersey Application January 15, 1944, Serial No. 518,395

2 Claims. (Cl. 219—34)

This invention relates to an electrically conducting panel, and more particularly to a laminated heating unit formed as a panel in which the heating element includes a flexible sheet having a plastic coating thereon containing electrically conducting carbon black in an amount sufficient to impart current conducting and heating properties to the sheet.

It is recognized that heating units employing electrically conducting carbon black have heretofore been used, however, the method of protecting and insulating the electric heating element so as to provide a complete composite and durable unit has been difficult of attainment. I have found that a good serviceable heating unit can be obtained by coating a base layer preferably of fabric with a thermo-plastic or thermo-setting synthetic resin containing electrically conducting carbon black. Electric wires are secured to opposite border portions of the coated fabric in parallel relation. Additional layers of fabric are treated with thermo-plastic or thermo-setting synthetic resin and these treated sheets are assembled to form a lamination in which the heating element is confined therebetween where it is protected and insulated by these treated sheets. An additional sheet may be used in the lamination in order to provide a desired texture, colored or decorative effect, and also a sheet of transparent thermo-plastic or thermo-setting synthetic resin may be used. These various laminations are placed in a platen press and subjected to heat and pressure. As a result the entire unit becomes bonded together to form a composite structure or panel.

The heating element is of smaller dimensions than the sheets applied thereto with the result that the heating unit is well insulated and completely enclosed within the laminae. This allows the marginal portions of the panel to be tacked or otherwise fastened to a supporting member without danger of injury to the heating element. A heating unit as thus described may be used for various purposes. For example it may constitute the panel portion of a screen or it may be used to form the surface of a wall.

Figure 2:
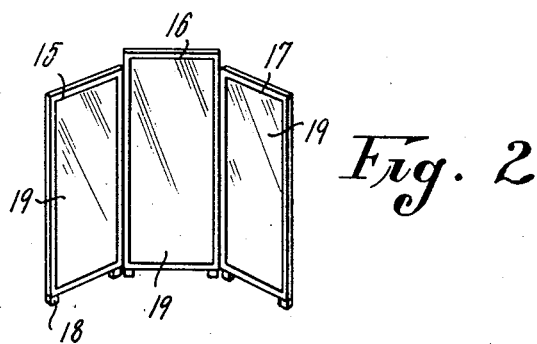

Among the advantages of my invention are to provide a heating panel comprising a unitary composite structure; to provide such a panel having a surface which is abrasive resisting and easy to clean; to provide such a panel which may exhibit artistic decorative effects; to provide such a panel which may be easily fastened to a supporting structure; to provide such a panel which may be made to relatively large dimensions and still retain self-supporting and stiff characteristics; and, to provide such a panel which may be economically and efficiently manufactured. These and other objects and advantages will appear more fully in the following detailed description when considered in connection with the following drawing, in which;

Fig. 1 is a perspective view of a heating panel constructed in accordance with my invention and mounted on a supporting structure; and, Fig. 2 is a perspective view of a folding screen illustrating a practical application for the heating panel.

With reference to the drawing and in particular to Fig. 1, I show a heating panel comprising in part a heating element 3. The element 3 preferably is a woven fabric such as 4 oz. cotton sheeting and on one or both sides of the sheeting is applied an electrically conducting solution consisting of a thermo-plastic or thermo-setting synthetic resin containing electrically conducting carbon black. An example of such a conducting material is a plasticized cellulose acetate and acetylene carbon black. Good results are obtained by proportioning the materials by weight as follows:

|  | Per cent |
|---|---|
| Cellulose acetate | 37.8 |
| Plasticizer | 30.5 |
| Acetylene black | 31.7 |

Any conventional plasticizer may be used with the cellulose acetate as for example methyl phthalyl ethyl glycolate. The compound may be thinned to proper consistency for application to the sheeting by thinning with a solvent such as ethyl acetate. This solution may be applied to the sheeting by painting, spraying or by a spreading operation.

Among the thermo-plastic or thermo-setting resins which may be compounded with electrically conducting carbon black to produce an electrically conducting film or layer are such plastics as phenol-formaldehyde, phenol-furfural, urea-formaldehyde, vinyl chloride acetate resins, polyvinyl chloride resins, polyvinyl butyral resins and polyvinyl alcohol.

When the applied coating is dried the coated sheet 3 is cut to proper size and electrical wires 4 are positioned near the border of opposite edges of the treated sheeting 3. The wires 4 are preferably formed of flat braided copper wire and marginal portions 5 of the cotton sheeting are lapped around the wire 4 and cemented or stitched down to completely enclose the wire 4. Before the stitching operation a solution similar to that applied to the sheeting 3 may be applied to the overlapping portion 5 to provide adhesion to the overlapped portion. An electrically insulated length of wire 6 is attached to each wire 4 to form serviceable conductors extending from the treated sheeting 3.

On the opposite sides of the treated conductive sheet 3 are electrically insulating layers 7 and 8. These layers may also be formed of 4 oz. woven cotton sheeting. The layers 7 and 8 are coated on both sides with a synthetic resin such as cellulose acetate. It is desirable to employ a plasticizer to the extent of about 25% to the cellulose acetate in order to provide desirable flexibility and freedom from cracking. The layers 7 and 8 are cut to a size slightly larger than the conductive layer 3. Preferably these layers should be about ¾ inch larger around the border portion than the coated layer 3. These three layers may be placed in a platen heater where the laminations are subjected to sufficient heat to bond them into a composite unit forming a panel. However, prior to such bonding operation it is desirable to apply to at least one surface of the composite structure a layer 9 of decorative material. While this layer 9 may constitute a coating of paint or color applied directly to the layer 8 it is more desirable to utilize a sheet of prepared colored or decorative material such as plain or printed cloth or wall paper. In order to provide protection for the decorative layer 9 a layer 10 of transparent cellulose acetate is assembled adjacent to the layer 9. The layers 7, 8, 9 and 10 are all cut to the same size. When thus assembled the entire laminated structure is placed in a flat smooth platen press. Good results have been obtained by operating the press at approximately 800 pounds pressure per square inch on the laminate, and by heating the press with steam at 45 pounds pressure. Under such pressure and temperature the laminate is allowed to remain in the press for a period of 4 minutes, thereafter the steam is exhausted from the press and cold water is circulated through the press for a period of 6 to 8 minutes before the laminate is removed. The completed panel as removed from the press constitutes a bonded laminate having the general characteristics of a unitary self-supporting, stiff, smooth panel which as a heating unit is useful in many applications.

In the construction of the present invention the conductive sheet 3 is well protected and completely insulated by the slightly larger covering sheets 7 and 8, and when the decorative layer 9 is provided with the transparent layer 10 it will be well protected and its ornamental appearance will be enhanced by the glossy surface supplied by the layer 10. Furthermore when these layers are bonded together by the resin of the different sheets a very durable panel is produced.

When used as the heating element of a screen the following construction has been found satisfactory; the total laminate is made to a size 18 inches by 66 inches, the wires running along the length of the laminate. The resistivity of the conducting sheet 3 is 256 ohms and when supplied with 110 volts A. C. current in a room maintained at 70° F. the surface temperature of the laminated heating element will be in the order of 120° F.

As shown in Fig. 1 the laminate is secured to a wood frame 11 by means of nails 12 which pierce the laminate without injury to the conducting fabric 3. A fiber board or other backing 13 may be attached to the opposite side of the frame 11 to add structural stability to the frame, and a tape or molding 14 functions as a binding for concealing the outer edges of the laminated panel, frame 11 and the fiber board 13. The molding may be cemented, tacked or otherwise fastened to the assembly.

Fig. 2 illustrates an application of the invention in the form of a heating screen comprising a plurality of folding sections 15, 16, and 17 hingedly joined together and supported by legs 18. Each of these sections is provided with a heating panel 19 which may be constructed as in Fig. 1. Various wire arrangements may be employed to supply the operating current to each of the panels 19. Used in this manner a folding screen is provided which may be highly ornamental and which also has good heating properties as it will throw out radiant heat from its entire area.

As thus shown and described it is believed apparent that I have provided a novel and useful article, and while I have described a preferred embodiment of my invention it is understood that it is susceptible of modifications which appear obviously within the spirit of the invention and as appearing in the scope of the appended claims.

Having thus described my invention what I claim and desire to protect by Letters Patent is:

1. A laminated heating unit comprising, a sheet of flexible material having applied thereon a synthetic resin compound containing electrically conducting carbon black in amount sufficient to impart current conducting and heating properties to the sheet, electrical conductor wires secured along two edges of the sheet in parallel relation to each other, a pair of layers of flexible protective material coated with a film of synthetic resin enclosing said sheet of flexible material, a flexible sheet of decorative material adjacent at least one of the layers of flexible protective material, and a flexible sheet of transparent synthetic resin adjacent to the decorative material, the whole being bonded together throughout the overlapping areas of the respective layers of material to form an integral stiff panel.

2. A laminated heating unit comprising, a sheet of flexible material having applied thereon a cellulose acetate compound containing electrically conducting carbon black in amount sufficient to impart current conducting and heating properties to the sheet, electrical conductor wires secured along two edges of the sheet in parallel relation to each other, a pair of layers of flexible protective material coated with a film of cellulose acetate enclosing said sheet of flexible material, a sheet of decorative material adjacent at least one of the layers of flexible protective material, and a sheet of transparent cellulose acetate adjacent to the decorative material, the whole being bonded together throughout the overlapping areas of said materials to form an integral stiff panel.

LOUIS MARICK.

REFERENCES CITED

The following references are of record in the file of this patent:

UNITED STATES PATENTS

| Number | Name | Date |
|---|---|---|
| 2,165,970 | Jaspers | July 11, 1939 |
| 2,255,376 | Bull et al. | Sept. 9, 1941 |

FOREIGN PATENTS

| Number | Country | Date |
|---|---|---|
| 224,648 | Great Britain | Nov. 20, 1924 |
| 427,255 | Great Britain | Apr. 8, 1935 |

OTHER REFERENCES

Ser. No. 317,610, Mossin (A. P. C.) pub. May 25, 1943.